US006131607A

United States Patent [19]

Cooke

[11] Patent Number: 6,131,607

[45] Date of Patent: Oct. 17, 2000

[54] DELIVERY VALVE

[75] Inventor: Michael Peter Cooke, Gillingham, United Kingdom

[73] Assignee: Lucas Industries public limited corporation, United Kingdom

[21] Appl. No.: 08/512,717

[22] Filed: Aug. 8, 1995

[30] Foreign Application Priority Data

Aug. 19, 1994 [GB] United Kingdom .................... 9416798

[51] Int. Cl.[7] ...................................................... F16K 17/04

[52] U.S. Cl. ........................... 137/508; 123/467; 137/509

[58] Field of Search ..................................... 137/508, 509; 123/467

[56] References Cited

U.S. PATENT DOCUMENTS

| | | | |
|---|---|---|---|
| 3,479,999 | 11/1969 | Keller et al. . | |
| 3,583,431 | 6/1971 | Diel | 137/508 X |
| 4,137,941 | 2/1979 | Gonin | 137/508 |
| 4,171,925 | 10/1979 | Krambrock | 137/508 X |
| 4,478,189 | 10/1984 | Fene | 123/467 |
| 4,628,957 | 12/1986 | Höfer et al. | 123/467 X |

FOREIGN PATENT DOCUMENTS

| | | |
|---|---|---|
| 706648 | 3/1954 | United Kingdom . |
| 728697 | 4/1955 | United Kingdom . |

OTHER PUBLICATIONS

Patent Abstract of Japan, vol. 15, No. 222 (M–1121) Jun. 6, 1991 & JP–A–03 064663 (Nippondenso) Mar. 20, 1991.

*Primary Examiner*—Stephen M. Hepperle
*Attorney, Agent, or Firm*—Cesari & McKenna

[57] ABSTRACT

A delivery valve includes a body defining a chamber into which from one end thereof extends a tubular support member. The interior of the member is connected to the outlet of a fuel pump and an outlet extends from the chamber to a fuel nozzle. Slidable about the support member is a first valve element which defines a seating in its end presented to the other end of the chamber. A second valve element is provided for engagement with the seating and a spring urges the first valve element into engagement with the second valve element. The first valve element also defines a surface against which the fuel pressure in the interior of the tubular member can act to lift the first valve element away from the second valve element to allow fuel flow from the outlet.

8 Claims, 1 Drawing Sheet

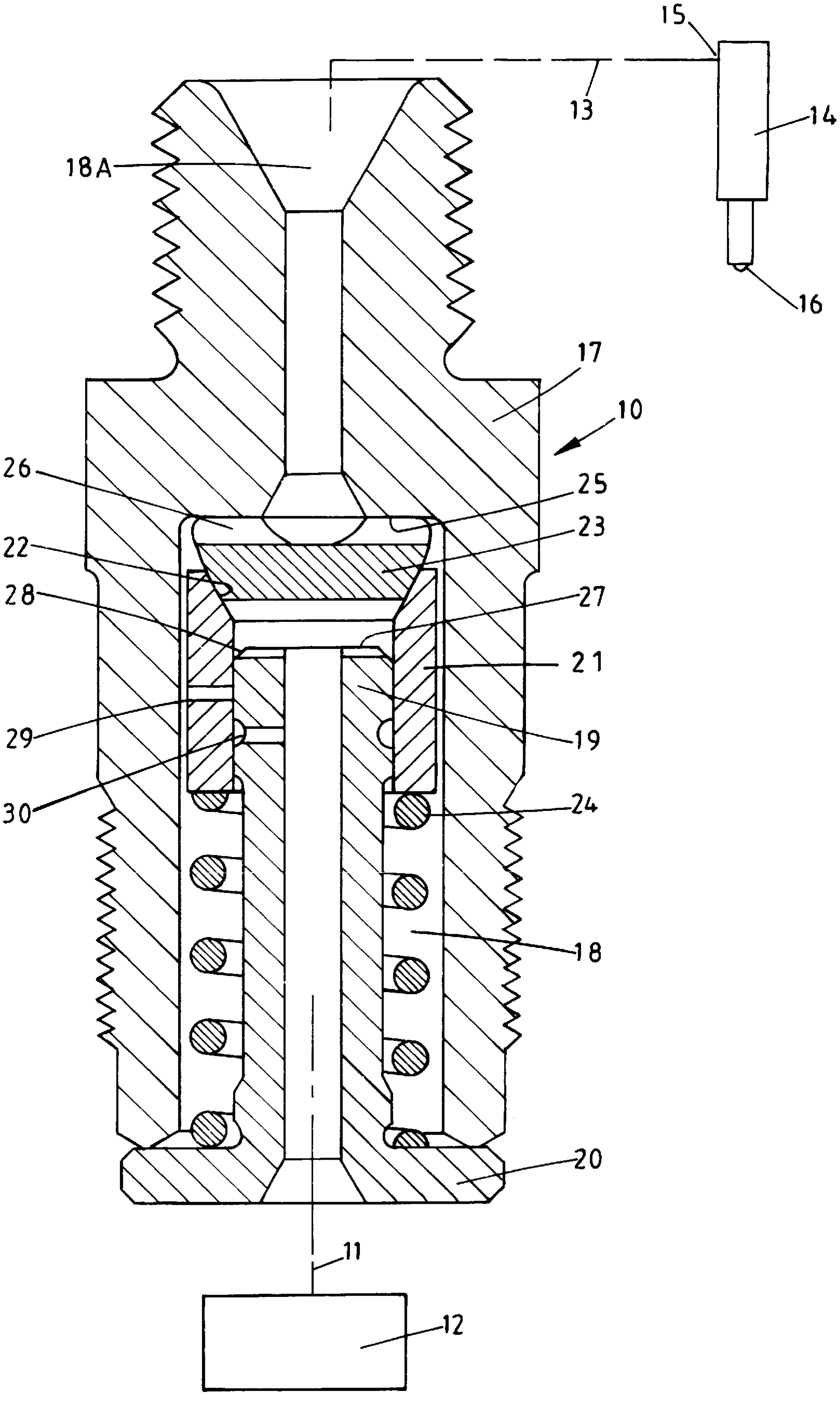
15
13
14
16
18A
17
10
26
25
22
23
28
27
21
29
19
30
24
18
20
11
12

DELIVERY VALVE

This invention relates to a delivery valve for incorporation in a fuel injection line connecting an outlet of a fuel injection pump with a fuel injection nozzle of a compression ignition engine, the valve being located in or adjacent the outlet of the pump.

The object of the invention is to provide a delivery valve for the purpose specified in a simple and convenient form.

According to the invention a delivery valve for the purpose specified comprises a body defining an elongated chamber, a tubular support member extending into the chamber from one end thereof, an outlet extending from the other end of the chamber, said outlet in use being connected to the end of the fuel injection line adjacent the pump, the interior of the support member being connected to the fuel injection pump outlet, a first valve element slidably mounted on the support member, the first valve element defining an annular seating at its end remote from the one end of the chamber, a second valve element shaped for engagement with the seating, resilient means biasing the first valve element away from said one end of the chamber into sealing engagement with said second valve element, first stop means acting to limit the movement of the valve elements under the action of the resilient means, second stop means engageable by said second valve element to limit the movement of the second valve element towards said one end of the chamber and said first valve element defining an area exposed to the fuel pressure within the tubular support member.

An example of a delivery valve in accordance with the invention will now be described with reference to the accompanying drawing which shows the delivery valve in sectional side elevation but in addition shows in outline only, parts of the associated fuel system.

With reference to the drawing the delivery valve is indicated at 10 and is located in the outlet 11 of a fuel injection pump 12. The pump can be of the rotary distributor type having a number of outlets equal to the number of cylinders of the associated engine in which case each outlet is provided with a separate delivery valve. The delivery valve 10 serves to connect the outlet 11 with a fuel injection line 13 which is connected to a fuel injection nozzle 14 of conventional construction. The nozzle incorporates a fuel pressure actuated and spring biased valve member which is lifted from a seating when the pressure at the inlet 15 of the nozzle attains a predetermined value and when lifted from the seating fuel can flow from the nozzle inlet 15 to an outlet orifice formed in a nozzle tip 16.

Such arrangements are well known in the art and during delivery of fuel the pressure in the fuel injection line attains a high value. When the pump has delivered the requisite amount of fuel, the fuel pressure at the outlet 11 of the pump falls and the purpose of the delivery valve is to maintain a pressure in the fuel delivery line 13 which is below the nozzle closing pressure, it being appreciated that in most instances the nozzle opening pressure is higher than the nozzle closing pressure.

The delivery valve comprises a generally cylindrical body 17 having an outlet 18A at one end for connection to the adjacent end of the fuel injection line 13. The body defines a hollow generally cylindrical chamber 18 and extending into the chamber from the open end thereof is a tubular support member 19 which conveniently is formed with an outwardly extending flange 20. The body 17 is conveniently screwed into the outlet 11 of the pump so that the flange 20 is trapped and forms a fuel tight seal with the body. The interior of the support member is in communication with the outlet 11 of the pump.

The delivery valve also includes a first valve element 21 which is in the form of a sleeve slidable on a portion of the support member 19, the working clearance between the sleeve and the support member being such that there will be very little fuel leakage therealong.

The inner end portion of the first valve element remote from the flange 20 is shaped to define a frusto conical seating 22 and for cooperation with the seating there is provided a second valve element 23 which is of generally plate like form.

The valve elements are biased into sealing engagement by means of a coiled compression spring 24 which is interposed between the flange 20 and the adjacent end surface of the first valve element and in the rest position as shown, the second valve element is urged into engagement with a first stop means in the form of the end wall 25 of the chamber. The adjacent surface of the second valve element is provided with radial or like slots 26 so as to ensure that the passage connecting the outlet 18A with the chamber 18 is not obturated. In the operation of the valve the two valve elements can move against the action of the spring and the extent of movement of the second valve element 23 towards the flange 20 is limited by second stop means in the form of the end surface 27 of the support member 19. This end surface is also provided with radial or like slots 28 to prevent obturation of the passage within the support member.

It will be noted that the engagement of the two valve elements takes place towards the outer portion of the seating 22 so that there is an inner annular area of the seating which is exposed to the pressure pertaining in the passage within the tubular support member and in operation when the output pressure of the pump increases the pressure acting on the aforesaid inner annular area will generate a force acting to move the first valve element against the action of the spring. Such movement takes place when the pre-stress in the spring 24 is overcome and then fuel can flow to the inlet of the fuel injection nozzle. When the pressure rises to a sufficiently high value the valve member in the nozzle lifts away from its seating and fuel flow takes place to the engine. The first valve element will move downwardly away from the second valve element to allow the flow of fuel. It will be appreciated that the pressure acting on the inner annular area of the first valve element is not balanced by the slightly lower fuel pressure acting on the equivalent area at the opposite end thereof, the lower fuel pressure being due to a throttling effects as the fuel flows between the two valve elements.

When delivery of fuel by the pump 12 ceases the first valve element 21 will move under the action of the spring into engagement with the second valve element but during such movement there is a reduction in the pressure in the pipeline and the valve member in the nozzle will move onto its seating. Such movement will create a pressure wave which travels along the injection line 13 towards the delivery valve and will displace the valve elements against the action of the spring 24 and such displacement tends to attenuate the shock wave. Moreover, if the displacement is sufficient a port 29 formed in the first valve element is brought into register with a circumferential groove 30 formed in the peripheral surface of the support member 19. The groove is in communication with the passage defined by the support member and when the port 29 registers with the groove some fuel is allowed to flow back towards the outlet of the injection pump. When the shock wave has been dissipated the valve elements return towards the position shown under the action of the spring 24 to re-pressurise the fuel in the injection line and the nozzle. If the shock wave is particularly intense, the second valve element will move into engagement with the end surface 27 of the support member and continued movement of the first valve means will open a larger flow path for fuel to escape from the fuel injection line 13.

As compared with a conventional delivery valve in which a valve head is guided for movement by a fluted stem within the equivalent of the support member 19, there is less restriction to the flow of fuel in the forward direction because the slots 26 can be made as large as required compared with the slots formed by the fluted stem. Moreover, the seating diameter can be larger than in the conventional valve so that less movement of the first valve element 21 is required to achieve a given flow area. As a result the stress to which the spring 24 is subject is reduced and the impact velocities are reduced.

What is claimed is:

1. A delivery valve for incorporation in a fuel injection line connecting an outlet of a fuel injection pump with a fuel injection nozzle of a compression ignition engine, the delivery valve being adjacent the outlet of the pump, and including a body defining an elongated chamber, an outlet extending from the chamber and being connected to the end of an injection line adjacent the pump, a tubular support extending into the chamber from one end thereof, the interior of the support member being connected to the outlet of the fuel injection pump, a first valve element slidably mounted on the support member, an annular seating defined on the end of the valve element remote from said one end of the chamber, a second valve element shaped for engagement with the seating, resilient means biasing the first valve element away from said one end of the chamber, first stop means acting to limit the movement of the valve elements under the action of the resilient means, second stop means engageable by the second valve element to limit the movement of the second valve element towards said one end of the chamber and said first valve element defining an area which is exposed to the fuel pressure within the tubular support member.

2. A delivery valve according to claim 1, in which said area is defined by the inner area of said annular seating.

3. A delivery valve according to claim 1, including a flow path which is opened to establish communication between the chamber and the interior of the support member when the valve elements have moved a predetermined extent against the action of the resilient means.

4. A delivery valve according to claim 3, in which said flow path comprises a port formed in the wall of the first valve element and a groove in the periphery of the support member said groove communicating with the interior of the support member.

5. A delivery valve according to claim 4, in which said second stop means is positioned to halt the movement of the second valve element after the port has moved into register with the groove, whereby the first valve element can continue to move against the action of the resilient means.

6. A delivery valve according to claim 1, in which said first stop means is defined by the end wall of the chamber at said other end thereof.

7. A delivery valve according to claim 1, in which said second stop means is defined by the end surface of the support member.

8. A delivery valve according to claim 6, in which said outlet opens onto said end wall and the adjacent surface of said second valve element is provided with slots to prevent obturation of said outlet.

* * * * *